Patented July 11, 1933

1,917,413

UNITED STATES PATENT OFFICE

JOHANN KARL WIRTH, OF BERLIN-WILMERSDORF, GERMANY

PROCESS FOR MANUFACTURING CHEMICAL RESISTING ARTICLES

No Drawing. Application filed March 10, 1926, Serial No. 93,771, and in Germany March 10, 1925.

Phenol-formaldehyde-condensation products form a very good chemical resisting material, but heretofore they have not been used for the manufacture of large storage or reaction vessels and like apparatus required by the chemical industry. The reason may be seen in that there are only two possibilities of manufacturing nonporous articles of phenol-aldehyde-artificial-resins by known methods, viz. 1, the liquid condensation products are cast in moulds, and 2, the artificial resin mixtures are hardened in a heated press under an extremely high pressure.

Neither method can be used for the manufacture of large apparatus. In hardening, the cast bodies shrink in such a way that flawless hollow bodies can not be made at all, whereas, solid bodies may be made only up to a weight of a few kilograms, the shrinkage being so great as to tear the object before its contraction against the die, or to release the pressure necessary to hardening. On the other hand, the necessary hot moulding apparatus which is required is so costly and weighty that the manufacture of a vessel of large size is economically impossible.

However, I have found that it is possible to manufacture large vessels and the like articles of any diameter from a condensation product, if in lieu of a nonporous material, one of a definite porosity is used. According to my invention the manufacture of such vessels is very simple. Pasty mixtures of artificial resins are stamped, kneaded, rolled or treated by a similar process, under low pressure, in an open mould in which the hardening of the material takes place in a known manner, either while the mould is open or after it has been closed with a yielding closure. For the manufacture of articles from the mixtures of the artificial resins, the condensation product is used in a liquid or dissolved state and so much of a preferably acid resisting filler is added as to fill a pasty mixture adapted to be kneaded, but not so adhesive as to be sticky. By experiments the best mixture for each case is to be found out. The moulds used for this mixture are open in contradistinction to the pressing moulds used heretofore. The mixture is brought into the moulds in the same way as is known with concrete. For the stamping, rolling or the like, tools of metal, wood or other suitable substance may be employed. To avoid the annoying adhesion of the material to said tools it is only necessary to strew an inert powder such as quartz or talc, or other substance, over the surface of the material to be kneaded or rolled or stamped. Hardening is then effected by applying heat to the material. It is essential for the new process that the work to be manufactured be not effected by the pressure of a stamp as is the case with heated presses, as otherwise it would crack due to shrinkage in hardening. If the moulds are to be closed the closure must be adapted to yield so that the material can be allowed to shrink without doing harm to its structure. Objects manufactured in this way are somewhat porous but the surface is covered with a dense crust. Said crust has to be removed in order to free the interior of the material from volatile constituents. Without such removal, the volatile constituents of the condensation products could not be driven out, and in heating beyond a temperature of 130° Celsius, blisters would be formed. The removal of the crust may be accomplished by grinding or by the intermediary of a sand blast. After the crust has been removed, the objects of manufacture are heated to a temperature of 200° Celsius or more, the heating time depending on the thickness of the object and the quantity of the volatile parts. With very large work pieces the heating time may last 30 to 70 hours or more.

The porosity of the articles manufactured according to the invention is small, measured on the capability of absorbing water, the porosity corresponding to 1 to 3% of the whole volume of the article. By varying the composition of the mixture the porosity may be increased or diminished, for instance, by using less porous fillers such as powder of quartz, or more porous fillers such as kieselguhr. The more the mixture contains of the condensation product and the softer it is, the denser will be the final material.

A porosity of 1 to 3% will be sufficient to allow good hardening, but in case the articles to be manufactured are designed to endure sudden and strong differences of temperature, then it would be better to choose a greater porosity.

Articles manufactured in the manner described may be impregnated with a phenol-aldehyde-condensation-product to be hardened, said impregnating means penetrating according to its liquidity and according to the method of impregnation, more or less into the article and forming a fully dense and impermeable surface which is extremely resistant to mechanical attacks. By the agency of vacuum and pressure it is possible to intensify the impregnation. In the most cases it will be sufficient to spread the liquid condensation product over the porous surface. As a matter of course, the protection of the surface may be restricted to any part of the article as found necessary or desirable.

Heretofore, it has been useful to add fibrous materials to the phenol-aldehyde-condensation products in forming the plastic mass, and to render the same more resistant, asbestos has been used. It has been found that the usual commercial asbestos is not suitable for the manufacture of chemical resisting vessels and the like, since the porosity of articles manufactured with such asbestos tends to increase, through the dissolution of certain acid soluble components of the commercial asbestos when subjected to the action of acid, especially acids from 1 to 3% to 50% and more. This drawback may be avoided by rendering the asbestos insoluble before mixing it with the phenol-condensation product by treating the same with dilute acid such as hydrochloric acid whereby all the soluble parts may be removed. Not all kinds of asbestos can be treated in this way but there are kinds of asbestos such as amphibole asbestos which will endure the treatment with acids. It was not known heretofore that asbestos after having been acid treated, to remove the soluble components possesses a sufficient stability or toughness for use in the manufacture of mechanical apparatus.

To render the subject matter of the invention clearer three examples will now be described.

Example I

A cylindrical vessel of two meters in diameter, two meters high and 40 mm. in wall thickness, with a flat bottom 50 mm. thick is to be manufactured. According to the new process the cylindrical part and the bottom may be manufactured separately. After both pieces have been well hardened they are assembled.

To manufacture the cylindrical part a mould is formed consisting of two or more segments of sheet iron adapted to be assembled to form a cylinder of a diameter of 2080 mm. and a height of 2000 mm. This cylindrical mould is secured together and put on a carriage on rollers so that it may be rotated upon its horizontal axis. Now the pasty substance consisting, for instance, of 50% of liquid phenolic condensation product and 50% of asbestos fiber is spread upon the wall of said cylinder. The substance is rolled to give the same the required thickness of 40 mm. To avoid the adhesion of the pasty product to the mould a powder of quartz is spread over its surface from time to time. The internal surface of the rolled surface is then supported by segments of sheet metal placed in overlapping relationship to form a cylinder and constrained outwardly by spring means. The segments yield and continue to give support to the material as it shrinks in hardening. After the rolling and covering or supporting of the cylindrical part of the vessel to be constructed, it is carried into the hardening oven to be hardened by heat treating. It is a matter of indifference whether the hardening chamber stands under atmospheric pressure or a higher pressure. The bottom part is simply manufactured by rolling the material on a sheet metal to the required thickness and then hardening it. After the hardening of both the parts they are assembled and the ring-shaped joint is filled with the pasty artificial resinous material, whereupon the whole vessel is heated for the purpose of hardening the joint. To strengthen the vessel, iron rings may be put around the cylindrical part thereof.

Example II

A casing and pipes of 20 cubic meters capacity are to be manufactured for a disintegrating drying plant in which acid liquids are to be dried at a temperature of 180 to 220° Celsius. The articles are made as in Example I. When such high degrees of temperature are to be used, it is advantageous to render the walls of the object impervious by the application of phenol-aldehyde-condensation products to one side only to avoid blistering. However, if the outer surface of the apparatus is likely to be attacked by the disintegrating influences, they may be impregnated with a liquid condensation product. Before impregnating, the dense outer crust is removed by grinding or sand blasting in order to free the volatile constituents herein before mentioned. If desired, first the inner wall may be impregnated and after stabilization of the inner tension in the material has taken place, which may require the lapse of several months, then the outer wall is impregnated. This is easily done by coating the wall with a mixture of the liquid condensation product and a suitable powder of quartz, graphite and the like.

Example III

Filtering press plates made of phenol-aldehyde-condensation products are to be manufactured. First a pasty mixture of a liquid condensation product and acid proof asbestos or the like is made and then the mixture is stamped into a suitable mould of iron. The bottom plate of said mould may be so arranged that it constitutes the negative or former for the channelling of the filter plate. Since filter plates have to be channelled on both sides, the channelling on the other side of the plate may be obtained by a suitable die. To prevent the mixture adhering to the die, a powder of quartz or the like is preferably spread on the surface to be treated. After the formation of the channellings the mould is put into the hardening oven. The hardened plates are taken out of the mould and the faying surfaces are ground whereby the crust is taken away and the pores are opened. Hereupon the plate is heated to a temperature of more than 100° Celsius until the volatile constituents of the condensation products are driven off, the packing surfaces are finished, and the pores are closed by impregnating the plate with a liquid phenol-aldehyde-condensation product, the filter-press-plate is then put into a frame and hardened a second time.

What I claim is:

1. A process of manufacturing chemically resisting bodies which consists in first making a pasty composition of a liquid condensation product of phenol and aldehydes mixed with an asbestos which has been purified with acid, then moulding in the cold said composition with light pressure into open moulds and then hardening the moulded composition in the same mould, so that the material of the resulting bodies though possessing absorbent properties is liquid-tight.

2. A process of manufacturing chemically resisting bodies which consists in first making a pasty composition of a liquid condensation product of phenol and aldehydes mixed with a filler, then moulding in the cold said composition with light pressure in elastically closed moulds and then hardening the moulded composition in the same mould, so that the material of the resulting bodies though possessing absorbent properties is liquid-tight.

3. A process of manufacturing chemically resisting bodies which consists in first making a pasty composition of a liquid condensation product of phenol and aldehydes mixed with an asbestos which has been purified with acid, then moulding in the cold said composition with light pressure in elastically closed moulds and then hardening the moulded composition in the same mould, so that the resulting material though possessing absorbent properties is liquid-tight.

4. A process of manufacturing chemically resisting bodies which consists in first making a pasty composition of a liquid condensation product of phenol and aldehydes mixed with a filler, then moulding in the cold said composition with light pressure into open moulds and then hardening the moulded composition in the same mould, so that the resulting bodies though possessing absorbent properties is liquid-tight, then removing the crust of the hardened article and then heating the body for the removal of volatile constituents.

5. A process of manufacturing chemically resisting bodies which consists in first making a pasty composition of a liquid condensation product of phenol and aldehydes mixed with a filler, then moulding in the cold said composition with light pressure in elastically closed moulds and then hardening the moulded composition in the same mould, so that the resulting material though possessing absorbent properties is liquid-tight, then removing the crust of the hardened article and then heating the article for the removal of volatile constituents.

6. A process of manufacturing chemically resisting bodies which consists in first making a pasty composition of a liquid condensation product of phenol and aldehydes mixed with a filler, then moulding in the cold said composition with light pressure in open moulds and then hardening the moulded composition in the same mould, then removing the crust of the hardened body and then heating the body for the removal of volatile constituents, applying a phenol-aldehyde condensation-product to the article and hardening the same to close the pores on the surface of the body.

7. A process of manufacturing chemically resisting bodies which consists in first making a pasty composition of a liquid condensation product of phenol and aldehydes mixed with a filler, then moulding in the cold said composition with light pressure in elastically closed moulds and then hardening the moulded composition in the same mould, then removing the crust of the hardened body and then heating the body for the removal of volatile constituents, applying a phenol-aldehyde condensation-product to the body and hardening the same to close the pores on the surface of the body.

8. A chemically resisting body made of phenol-aldehyde resin mixed with an asbestos which has been acid treated to remove all acid soluble constituents, to yield a composition which while possessing absorbent properties is liquid-tight.

In testimony whereof I have signed my name to this specification.

JOHANN KARL WIRTH.